UNITED STATES PATENT OFFICE.

WILLIAM TYRRELL, OF SEATTLE, WASHINGTON, ASSIGNOR TO NEW ERA IRON AND STEEL CORPORATION, OF SEATTLE, WASHINGTON.

PROCESS OF BRIQUETING ORES.

1,356,100.  Specification of Letters Patent. Patented Oct. 19, 1920.

No Drawing. Application filed May 29, 1919. Serial No. 300,639.

*To all whom it may concern:*

Be it known that I, WILLIAM TYRRELL, a citizen of the United States, residing at Seattle, in the county of King and State of Washington, have invented certain new and useful Improvements in Processes of Briqueting Ores, of which the following is a specification.

This invention relates to a process of briqueting comminuted ores, concentrates, or black sands, prior to their introduction into a reducing flame, and to the briquets obtained by such process.

An important object of the invention is to provide a briquet of the above mentioned character, which will not fuse prior to the reducing of the metal being treated, and which will retain its shape without wasting prior to the reduction step.

A further object of the invention is to provide a binder for the comminuted ore or the like, formed of constituents which are plentiful in nature and hence may be obtained at a low cost.

Other objects and advantages of the invention will be apparent during the course of the following description.

In the use of briquets, in metallurgical furnaces, such as reducing furnaces, the heat necessary to reduce the metal compounds being treated, will frequently disintegrate the ordinary briquet. If a blast furnace is used, the fine particles of the metals frequently become mixed with the fused briquet, and as a result of this the briquets waste, the fine particles of the briquets being blown to the atmosphere through the down comers or gas outlets of the furnace. When the furnace has no blast or blower, if the briquets are inferior, due to an improper binder, for the ground ores, such briquets will disintegrate before the metals fuse or are reduced.

In accordance with my invention I form a briquet of ground ores, by employing a binder which has a higher fusing point than the ores, whereby the binder will not fuse prior to the reducing of the ore. If the binder should fuse, prior to the reducing of the ores, the briquets will choke the furnace, before the temperature necessary to reduce the metals is reached.

In producing the binder for my briquet, I preferably employ the following ingredients, preferably in the proportions stated:—

(1) Sodium sulfate ($Na_2SO_4$), 2 parts by weight, (2) Diatomaceous earth, 2 parts by weight, (3) Concentrated lye, 2 parts by weight, (4) Carbonate of magnesium, 1 part by weight.

The concentrated lye used is composed of the following:

Sodium hydroxid _____ 94%
Sodium carbonate _____ 2%

*Inert ingredients.*

Sodium sulfate _____ 1%
Sodium chlorid _____ 1%
Moisture _____ 2%

The solid constituents of the binder are preferably finely divided, ground, or powdered, and thoroughly mixed together. Assuming that a quantity of four pounds of the foregoing ingredients has been mixed according to the proportions given, I now take 96 pounds of comminuted iron ore, or the like, on the one hand, and separately pour enough of water into the 4 lbs. of ingredients mentioned, to cause it to assume a practically fluid state. Cold water would do, but I prefer to use warm water. I then pour this fluid into the 96 pounds of comminuted iron or the like, and thoroughly mix, which produces a more or less plastic mass, which I then mold into briquets of suitable shape and size and allow them to dry or harden, or the mass to be treated in any other suitable way to produce the briquets.

Should the ores, concentrates, or sands, to be briqueted, contain traces of compounds of arsenic, antimony, copper-like material which would be deleterious to the metals to be recovered, I then add one (1) part by weight of salt (NaCl) to the binder composition, above described. This added salt converts the arsenic compounds and the like into volatile chlorids, which are driven off during the reduction of the briquets in the furnace.

From the foregoing description it will be seen that I have produced a briquet having a binder with a fusing point above that of the metal ore being treated, so that the binder will not fuse prior to the fusing of the ore or its reduction.

Having thus described my invention, I claim:—

1. A briquet for metallurgical purposes, comprising finely divided metal ores or the like, and a binder having a higher fusing point than the metals, said binder containing two (2) parts by weight of sodium sulfate, two (2) parts by weight of diatomaceous earth, two (2) parts by weight of concentrated lye, and one (1) part by weight of magnesium carbonate.

2. A briquet for metallurgical purposes, comprising ninety-six (96) parts by weight of finely divided metal ore or the like, and four (4) parts by weight of a binder, said binder containing two (2) parts by weight of diatomaceous earth, two (2) parts by weight of sodium sulfate, two (2) parts by weight of concentrated lye, and one (1) part by weight of magnesium carbonate.

In testimony whereof I affix my signature.

WILLIAM TYRRELL.